Patented Dec. 20, 1949

2,491,926

UNITED STATES PATENT OFFICE 2,491,926

CATALYTIC HYDROGENATION OF HYDROPEROXIDES

Eugene J. Lorand, Wilmington, Del., and John E. Reese, St. Simons Island, Ga., assignors to Hercules Powder Company, Wilmington, Del., a corporation of Delaware No Drawing. Application April 12, 1947, Serial No. 740,990

14 Claims. (Cl. 260—618)

This invention relates to the preparation of alcohols and, more particularly, to the process of converting organic hydroperoxides to the corresponding alcohols.

It has been known that certain organic hydroperoxides could be converted to the corresponding alcohols through use of various reducing agents, and some of these reducing agents have been found applicable to the reduction of $\alpha,\alpha$-dialkylarylmethyl hydroperoxides for the preparation of $\alpha,\alpha$-dialkylarylmethyl alcohols. The reducing agents previously utilized by the art, however, have been disadvantageous in that they have been inefficient in effecting the desired reduction and have not been economical to use.

Now in accordance with this invention, it has been found that $\alpha,\alpha$-dialkylarylmethyl alcohols may be simply and economically obtained by catalytically hydrogenating the corresponding hydroperoxides. In carrying out the process in accordance with this invention the well-known techniques of catalytic hydrogenation are utilized. As an example, a hydrogenation vessel may be charged with a Raney nickel catalyst and with an $\alpha,\alpha$-dialkylarylmethyl hydroperoxide such as $\alpha,\alpha$-dimethylbenzyl hydroperoxide dissolved in a suitable hydrogenation solvent such as methanol. The hydrogenation vessel then may be sealed and filled with hydrogen and the hydrogenation carried out until the hydroperoxide has been substantially converted to the alcohol. Upon completion of the hydrogenation the catalyst may be filtered from the methanol solution containing the $\alpha,\alpha$-dimethylbenzyl alcohol, the methanol removed by distillation, and the $\alpha,\alpha$-dimethylbenzyl alcohol recovered.

The following examples constitute specific embodiments of the invention. All parts are on a parts by weight basis.

Example 1

A nickel-aluminum alloy containing 50% nickel and 50% aluminum was activated with 20% sodium hydroxide, washed free of the sodium hydroxide, and stored under water. Ten parts of this Raney nickel catalyst was washed three times with methanol and then placed in a pressure bottle of a Parr hydrogenation apparatus with 40 parts of methanol. To the pressure bottle then was added 74.4 parts of a reaction mixture obtained by the oxidation of cumene with molecular oxygen and containing 46% $\alpha,\alpha$-dimethylbenzyl hydroperoxide. The air then was carefully removed from the bottle by alternately evacuating the bottle and filling with hydrogen at atmospheric pressure. Finally, the apparatus was charged with hydrogen under a pressure of 60 pounds. After shaking for 17.5 hours the hydrogen absorption amounted to 0.358 part. The hydrogenation mixture then was filtered to remove the catalyst and the methanol was removed by distillation. The 46.1 parts residue had a hydroperoxide content of 0.5% and a refractive index at 20° C. of 1.5110. Of the total residue 36.1 parts was $\alpha,\alpha$-dimethylbenzyl alcohol.

Example 2

Forty parts of the Raney nickel catalyst of Example 1 and 120 parts of methanol were charged into a nickel autoclave of the rocker type for hydrogenation. Three hundred parts of crude $\alpha,\alpha$-dimethylbenzyl hydroperoxide (60% hydroperoxide) as obtained by the oxidation of cumene with molecular oxygen in the presence of a 2% aqueous sodium hydroxide solution was dissolved in 212 parts of methanol. After the autoclave was charged with hydrogen at 200 lb./sq. in. pressure the methanol solution of the hydroperoxide was gradually pumped into the autoclave. At first there ensued a sudden pressure rise which leveled off shortly afterward and was maintained at 195 lb./sq. in. for the next 11 hours. During this time the temperature rose from 25° to 33° C. Upon completion of the hydrogenation the product was recovered by filtering out the catalyst and distilling off the methanol. The 202.3 parts of crude product then was subjected to fractional distillation in a packed column having an efficiency of 20 theoretical plates. There was recovered 150 parts of a fraction distilling at 114° to 120° C. at 46.6 mm./sq. cm. pressure and consisting essentially of $\alpha,\alpha$-dimethylbenzyl alcohol.

Example 3

One-half part of Adams' platinum oxide catalyst and 50 parts of methanol in which 0.07 part of sodium hydroxide had been dissolved were placed in a pressure bottle of a Parr hydrogenation apparatus. After adding 96.6 parts of the same crude hydroperoxide used in Example 2, the air was displaced with hydrogen in the same way as in Example 1. The apparatus then was placed under 50 lb./sq. in. hydrogen pressure and shaken for 4 hours. During this time 0.46 part of hydrogen was absorbed. The product was filtered, the methanol distilled off at reduced pressure, and the residue fractionated in a packed column having an efficiency of 20 theoretical plates. There was obtained 45 parts of a fraction distilling at 119° to 120° C. under 47 mm./sq. cm. pressure and consisting of α,α-dimethylbenzyl alcohol.

*Example 4*

A glass reaction vessel was equipped with a mechanical stirrer, a condenser, a dropping funnel, and a sparge tube with a sintered glass plate as an opening, the condenser also being fitted with a tube to carry off the exit gases. After sweeping the air from the reaction vessel with nitrogen, 0.25 part of Adams' platinum oxide catalyst and 120 parts of methanol in which 0.08 part of solid sodium hydroxide had been dissolved were charged into the reaction vessel, the nitrogen then being displaced by hydrogen. A total of 338 parts of cumene oxidized with molecular oxygen and containing 58% α,α-dimethylbenzenyl hydroperoxide was allowed to drip into the reaction vessel while vigorous agitation was maintained and while hydrogen was passed through the reaction vessel at a rapid rate. The heat of reaction caused the temperature to rise to 40° C., and this temperature was maintained during the whole course of the reaction. During the reduction, the hydroperoxide content of the reaction mixture was determined at regular intervals by the standard iodine liberation method, which involved removal of a sample from the reaction vessel, addition of the sample to an acidified potassium iodide solution, and measurement of the amount of iodine liberated. At the end of 20 hours the reaction was complete. Upon completion of the reduction the reaction mixture was filtered to remove the catalyst, and the methanol and part of the cumene originally present in the crude oxidized cumene were distilled off at reduced pressure. The residue then was fractionally distilled as in Example 3 and there was obtained a fraction of 200 parts distilling at 119° to 121° C. under 49.5 mm./sq. cm. pressure and consisting of α,α-dimethylbenzyl alcohol.

*Example 5*

A cobalt-aluminum alloy containing 42% cobalt and 58% aluminum was activated with a 20% aqueous sodium hydroxide solution at 50° C., washed free of caustic, and stored under methylcyclohexane. Three and three-tenths parts of this Raney cobalt catalyst and 75 parts of anhydrous methanol were charged into a pressure bottle of a Parr hydrogenation apparatus. To the bottle then was added 33 parts of the crude reaction mixture obtained by oxidizing p-cymene with oxygen in the presence of an aqueous alkaline phase at a temperature of 70° to 90° C. and distilling off most of the unreacted p-cymene at reduced pressure (from 15 mm. down to 2.0 mm./sq. cm.). This crude reaction mixture contained 47.5% of α,α-dimethyl-p-methylbenzyl hydroperoxide. The air in the apparatus then was displaced with hydrogen as in Example 1, after which the apparatus was charged with hydrogen under 60 lb./sq. in. pressure. After the hydrogenation vessel had been shaken for 6.5 hours at 25–26° C. an additional 1.7 parts of the catalyst was introduced and the treatment continued for 6 more hours. After filtering out the catalyst the hydroperoxide content of the filtrate was determined as 0.06%. The methanol was distilled off at reduced pressure to obtain 31 parts of a liquid residue which was subjected to steam distillation to obtain 25 parts of a colorless distillate. The distillate contained 96% α,α-dimethyl-p-methylbenzyl alcohol.

*Example 6*

The catalyst used in this example was Harshaw Supported nickel catalyst No. 78 (nickel deposited on kieselguhr) which had been reduced, stabilized, and ground to pass a 100-mesh screen. Three and three-tenths parts of this catalyst, 75 parts of methanol, and 33 parts of the crude reaction mixture obtained by the oxidation of diisopropylbenzene with oxygen in the presence of an aqueous alkaline phase and containing 41.5% hydroperoxide were charged into the same apparatus used in Example 5. Air was displaced from the apparatus following the procedure of Example 1 and a hydrogen pressure of 60 lb./sq. in. then applied. Hydrogenation then was permitted to take place for 5.5 hours at a temperature of 25–27° C., after which the catalyst was filtered out and the methanol removed from the filtrate by distillation at reduced pressure. There was obtained 28 parts of a product containing 0.2% hydroperoxide. On standing, a portion of the product crystallized in the form of white crystals which were filtered and dried. These crystals amounted to 3.2 parts by weight and were characterized as α,α,α',α'-tetramethyl-p-xylylene dialcohol. The remaining liquid contained 53% α,α-dimethyl-p-isopropylbenzyl alcohol and 4.1% p-isopropylacetophenone.

The process in accordance with this invention has been shown by the examples as applied to the hydroperoxides obtained from the oxidation of cumene, p-cymene, and diisopropylbenzene, but the process also is operable in connection with other α,α-dialkylarylmethyl hydroperoxides. Such hydroperoxides may be prepared by the oxidation of alkyl-substituted aromatic compounds having the structural formula

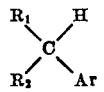

in which $R_1$ and $R_2$ represent alkyl groups and $Ar$ represents a substituent selected from the group consisting of aryl and alkaryl groups. The oxidation may be carried out in the liquid phase utilizing air or oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° and about 95° C. in the presence of an aqueous alkali. The concentration of the alkali may be between about 1 and about 35% although it is preferable to use concentrations of about 2 to about 8%. Vigorous agitation is desirable during the oxidation reaction.

Illustrative of the alkyl-substituted aromatic organic compounds which may be oxidized are p-cymene, cumene, and diisopropylbenzene, these compounds leading to α,α-dimethyl-p-methylbenzyl, α,α-dimethylbenzyl, and α,α-dimethyl-p-isopropylbenzyl hydroperoxides, respectively. Also, in the case of diisopropylbenzene, there may be obtained α,α,α',α'-tetramethyl-p-xylylene dihydroperoxide. The aryl and substituted aryl groups need not be derived from benzene as is the case in the afore-mentioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, secondary butyl, tertiary butyl, and the like to give alkaryl substituents, the same alkyl groups also being representative of $R_1$ and $R_2$ in the structural formula. $R_1$ and $R_2$ may be either the same or different.

In order to produce the alcohols according to this invention the hydroperoxides may be used either in the pure form or diluted with solvents. When, for example, the hydroperoxides are obtained by oxidation of the alkyl-substituted aromatic compounds having the structural formula shown previously, the oxidation usually is interrupted before all of the hydrocarbon has reacted in order to avoid or limit side reactions. In this manner the hydroperoxide is obtained in mixture with smaller or larger amounts of the original hydrocarbon, and the mixture also may contain secondary reaction products such as alcohols, ketones, and the like. It is not necessary to isolate, separate, or even concentrate the hydroperoxide from such a reaction mixture since the reduction can be carried out directly in the reaction mixture. In case it is desirable, the hydroperoxide may be separated from the other constituents of the reaction mixture by, for example, fractional distillation at very low pressures, of the order of 0.01 to 1.0 mm./sq. cm., the hydroperoxides having higher boiling points than the related hydrocarbon, alcohol, and ketone. In some cases the hydroperoxide also may be separated from the oxidation reaction mixture by crystallization, which may be facilitated by first distilling off at least part of the hydrocarbon.

In carrying out the process of this invention, therefore, the hydroperoxides or the oxidation products containing them may be used as such, but it is preferable to use a solvent to avoid too rapid reaction and the frequently resulting sudden heat evolution. It is apparent in the case of the oxidation reaction mixtures containing the hydroperoxides that a considerable amount of solvent originally is present due to the presence of unreacted hydrocarbon, but even in such instances the addition of further amounts of solvent is desirable. As solvents, the usual hydrogenation solvents such as methanol, ethanol, methylcyclohexane, isopropyl ether, dioxane, ethyl acetate, and the like, are suitable. In addition, glacial acetic acid is a suitable solvent for use in conjunction with a noble metal catalyst for hydrogenations carried out at low temperatures. The amount of solvent may vary within wide limits, from a few per cent to several hundred per cent, based on the amount of hydroperoxide, but too much dilution due to the use of large amounts of solvent not only requires larger and more expensive equipment but also slows down the hydrogenation. It therefore is preferable to use solvents in amounts in the range of about 50 to about 150% by weight based on an oxidation reaction mixture containing about 50% hydroperoxide, this amount of solvent being from about 100 to about 300% by weight based on the amount of pure hydroperoxide.

The examples have shown the utilization of platinum oxide, Raney nickel, Raney cobalt, and supported nickel catalysts and, in general, both noble metal and base metal catalysts are operable in accordance with the process of this invention. Exemplary of the noble metal catalysts are platinum oxide, reduces platinum, both supported and unsupported, palladium, rhodium, and the like. When such catalysts are used, it is advisable to add a slight amount of a caustic alkali such as sodium hydroxide to the hydrogenation reaction mixture to prevent hydrogenation of the aromatic ring in the $\alpha,\alpha$-dialkylarylmethyl hydroperoxides. As examples of base metal catalysts there may be mentioned the heavy metal catalysts such as nickel and cobalt, both supported and unsupported. Particularly useful are those catalysts obtained by activating nickel-aluminum and cobalt-aluminum alloys with aqueous sodium hydroxide. Such catalysts are generally known as Raney metal catalysts. The amount of the catalyst may be varied considerably, the amount depending mainly upon the nature of the catalyst. Platinum oxide, for example, may be used in an amount of about 0.05% by weight based on the amount of hydroperoxide. On the same basis an unsupported catalyst such as Raney nickel may be used in an amount from about 1 to about 25%, preferably from about 5 to about 15%, and a supported base metal catalyst such as supported nickel may be used in amounts from about 0.2 to about 8%, preferably from about 1 to about 5%.

During the hydrogenation, the temperature may be maintained between about 20° and about 60° C., preferably between about 25° and about 50° C. Although higher temperatures than these may be utilized during the hydrogenation it must be realized that at the higher temperatures the hydrogen does not dissolve in the reaction medium to as great an extent as it does at the lower temperatures and that the rate of reaction may therefore be decreased. This effect of lower hydrogen solubility may be counteracted considerably by increasing the hydrogen pressure. In addition, however, if higher temperatures are utilized, the rate of introduction of the hydroperoxide must be decreased in order that reduction by the hydrogen takes place rather than the decomposition by the catalyst. In general, the time involved in the hydrogenation may vary from about 1 to about 25 hours. The length of time involved in any particular hydrogenation depends upon the concentration of the hydroperoxide. The initial reduction of the hydroperoxide proceeds at a rapid rate and in so doing the hydroperoxide content is decreased. The amount of hydroperoxide remaining is therefore present in low concentration in the solvent used during the hydrogenation and since it is much more difficult to hydrogenate the hydroperoxide in such a low concentration, most of the total time involved in the hydrogenation is that used to reduce the small amounts of hydroperoxide existing following the initial rapid reduction.

As shown by the examples, the pressure during hydrogenation may be varied from atmospheric pressure to about 200 lb./sq. in. In general, the hydrogen pressure may be varied from atmospheric pressure to about 1000 lb./sq. in. It is preferable, however, due to the exothermic nature of the reaction involved, not to utilize a hydrogen pressure exceeding about 300 lb./sq. in. By maintaining the initial hydrogen pressure at a fairly low level, leeway is provided for any subsequent pressure rise resulting from the heat of reaction. When noble metal catalysts are used, the hydrogenation may be carried out at atmospheric pressure and in such instances, as shown in Example 4, the reaction vessel need not be closed. In other words, the hydrogenation may be satisfactorily carried out merely by passing hydrogen through a well-agitated mixture of the hydroperoxide, solvent, and catalyst. During use of noble metal catalysts, however, pressures up to about 40 to about 60 lb./sq. in. may be advantageous. In so far as base metal catalysts are concerned, a pressure of at least about 50 to about 60 lb./sq. in. are necessary and such pressures are sufficient when the hydrogenation is carried out in a glass vessel such as that utilized in a Parr hydrogenation apparatus. When the base metal catalysts are used in autoclaves of laboratory and commercial size, it is preferable to use pressures between about 200 and about 300 lb./sq. in.

During the hydrogenation process it is necessary to provide for good agitation, consequently, the hydrogenation apparatus should be equipped for shaking, rocking, or stirring by use of conventional devices. It also is desirable that the hydrogenation apparatus be equipped with a cooling system for the purpose of checking rapid temperature rises. Cooling is particularly desirable in those hydrogenations wherein high hydrogen pressures are utilized or wherein large volumes of hydroperoxides are handled. In the latter case it is preferable to introduce the hydroperoxide gradually into the well-agitated dispersion of the catalyst and solvent. This procedure not only insures that a more gradual reaction will take place, thereby avoiding rapid heat evolution with the accompanying pressure rise, but it also prevents deactivation of the catalyst.

The examples have shown the hydrogenations as being carried out batchwise but they may be effected also in a continuous manner. Upon completion of the reduction of the hydroperoxide the catalyst may be removed by filtration and the solvent by distillation, preferably at reduced pressure. The residual reaction mixture then may be fractionated at reduced pressure in a suitable column in order to separate the alcohol from the hydrocarbon present in the original crude oxidation reaction mass. The original crude oxidation reaction mass also may contain some ketones. In the oxidation of cumene, for example, a small amount of acetophenone is formed. During the catalytic hydrogenation in accordance with this invention, such ketones also will usually be reduced simultaneously with the hydroperoxides forming secondary alcohols.

The process in accordance with this invention provides one of the simplest and most economical methods for obtaining substantially pure alcohols from the products obtained by the oxidation with molecular oxygen of compounds such as cumene, p-cymene, diisopropylbenzene, and the like. The catalytic hydrogenation process of this invention is more efficient in effecting the desired reduction than is the case with other reducing agents known to the art. The process is particularly useful in those instances in which the alcohols have been difficultly obtained by other processes. By oxidizing a hydrocarbon and proceeding through the hydroperoxide as intermediate, it often is possible to obtain, using the process of this invention, the alcohol more easily and economically than otherwise would be possible. The products obtained according to this invention find various commercial applications. For example $\alpha,\alpha$-dimethyl-p-methylbenzyl alcohol is used in the essential oil industry as a perfume base for soaps. This compound also is an efficient frothing agent in the flotation of copper, zinc, and lead sulfide ores.

$\alpha,\alpha$-Dimethylbenzyl alcohol has similar commercial applications. The dihydric alcohols such as those derived from diisopropylbenzene also are efficient frothing agents in heavy metal, especially lead sulfide, ore flotations. All of the alcohols are good wetting-out agents.

What we claim and desire to protect by Letters Patent is:

1. The process of preparing an $\alpha,\alpha$-dialkylarylmethyl alcohol which comprises catalytically hydrogenating an $\alpha,\alpha$-dialkylarylmethyl hydroperoxide in the presence of an active metal hydrogenation catalyst.

2. The process of preparing an $\alpha,\alpha$-dialkylarylmethyl alcohol which comprises catalytically hydrogenating an $\alpha,\alpha$-dialkylarylmethyl hydroperoxide at a temperature between about 20° and about 60° C. in the presence of an active metal hydrogenation catalyst.

3. The process of preparing an $\alpha,\alpha$-dialkylarylmethyl alcohol which comprises catalytically hydrogenating an $\alpha,\alpha$-dialkylarylmethyl hydroperoxide at a temperature between about 25° and about 50° C. in the presence of an active metal hydrogenation catalyst.

4. The process of preparing $\alpha,\alpha$-dimethylbenzyl alcohol which comprises catalytically hydrogenating $\alpha,\alpha$-dimethylbenzyl hydroperoxide in the presence of an active metal hydrogenation catalyst.

5. The process of preparing an $\alpha,\alpha$-dialkylarylmethyl alcohol which comprises catalytically hydrogenating an $\alpha,\alpha$-dialkylarylmethyl hydroperoxide in the presence of an active noble metal hydrogenation catalyst.

6. The process of preparing an $\alpha,\alpha$-dialkylarylmethyl alcohol which comprises catalytically hydrogenating an $\alpha,\alpha$-dialkylarylmethyl hydroperoxide in the presence of a platinum hydrogenation catalyst.

7. The process of preparing an $\alpha,\alpha$-dialkylarylmethyl alcohol which comprises catalytically hydrogenating an $\alpha,\alpha$-dialkylarylmethyl hydroperoxide in the presence of an active base metal hydrogenation catalyst.

8. The process of preparing an $\alpha,\alpha$-dialkylarylmethyl alcohol which comprises catalytically hydrogenating an $\alpha,\alpha$-dialkylarylmethyl hydroperoxide in the presence of a cobalt hydrogenation catalyst.

9. The process of preparing an $\alpha,\alpha$-dialkylarylmethyl alcohol which comprises catalytically hydrogenating an $\alpha,\alpha$-dialkylarylmethyl hydroperoxide in the presence of a Raney cobalt catalyst.

10. The process of preparing $\alpha,\alpha$-dimethyl-p-methylbenzyl alcohol which comprises catalytically hydrogenating $\alpha,\alpha$-dimethyl-p-methylbenzyl hydroperoxide in the presence of a Raney cobalt catalyst.

11. The process of preparing $\alpha,\alpha$-dimethylbenzyl alcohol which comprises catalytically hydrogenating $\alpha,\alpha$-dimethylbenzyl hydroperoxide in the presence of a nickel hydrogenation catalyst.

12. The process of preparing $\alpha,\alpha$-dimethylbenzyl alcohol which comprises catalytically hydrogenating $\alpha,\alpha$-dimethylbenzyl hydroperoxide in the presence of a Raney nickel catalyst.

13. The process of preparing $\alpha,\alpha$-dimethylbenzyl alcohol which comprises dissolving $\alpha,\alpha$-dimethylbenzyl hydroperoxide in a hydrogenation solvent, catalytically hydrogenating the dissolved hydroperoxide in the presence of a Raney nickel catalyst, removing the catalyst by filtration, distilling off the hydrogenation solvent and recovering the $\alpha,\alpha$-dimethylbenzyl alcohol.

14. The process of preparing $\alpha,\alpha$-dimethyl-p- isopropylbenzyl alcohol which comprises catalytically hydrogenating α,α-dimethyl-p-isopropylbenzyl hydroperoxide in the presence of a platinum hydrogenation catalyst.

EUGENE J. LORAND.
JOHN E. REESE.

REFERENCES CITED

The following references are of record in the file of this patent:

Hock et al., Ber. Deut. Chem., vol. 77, pages 257–264 (1944).

Hock et al., Ber. Deut. Chem., vol. 75, pages 313–316 (1942).